(No Model.) 5 Sheets—Sheet 2.
C. A. PARSONS.
ROTARY MOTOR.
No. 328,710. Patented Oct. 20, 1885.
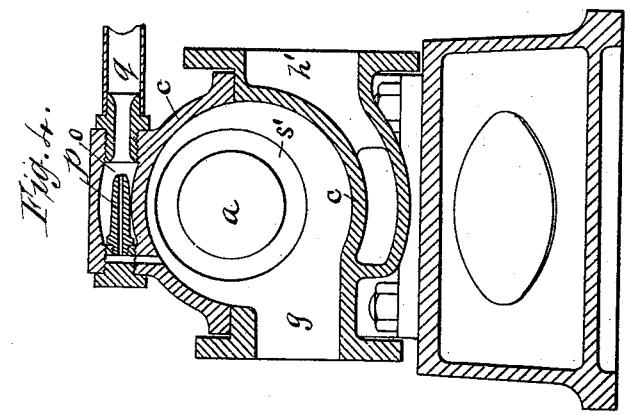
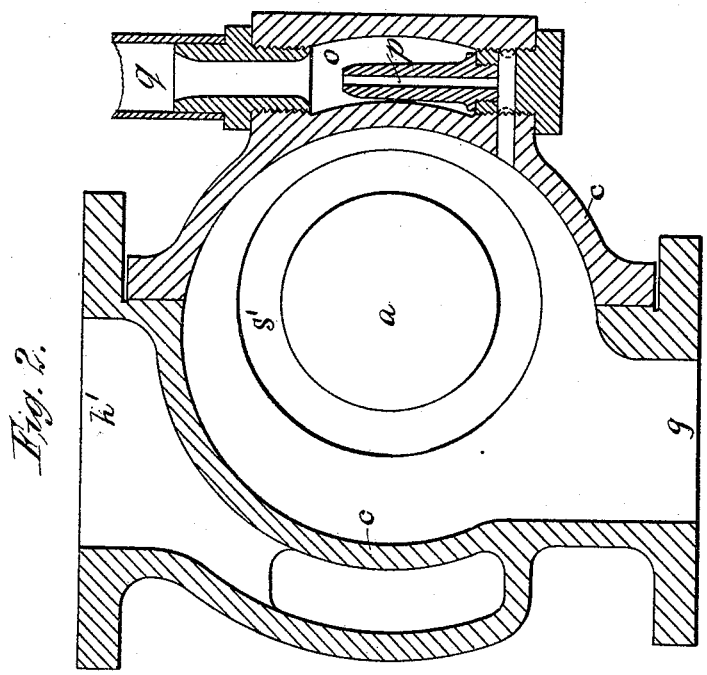
Witnesses
J H Blackwood
F J Chapman
Inventor;
Charles A. Parsons
by M H Doolittle
atty
N. PETERS, Photo-Lithographer, Washington, D. C.

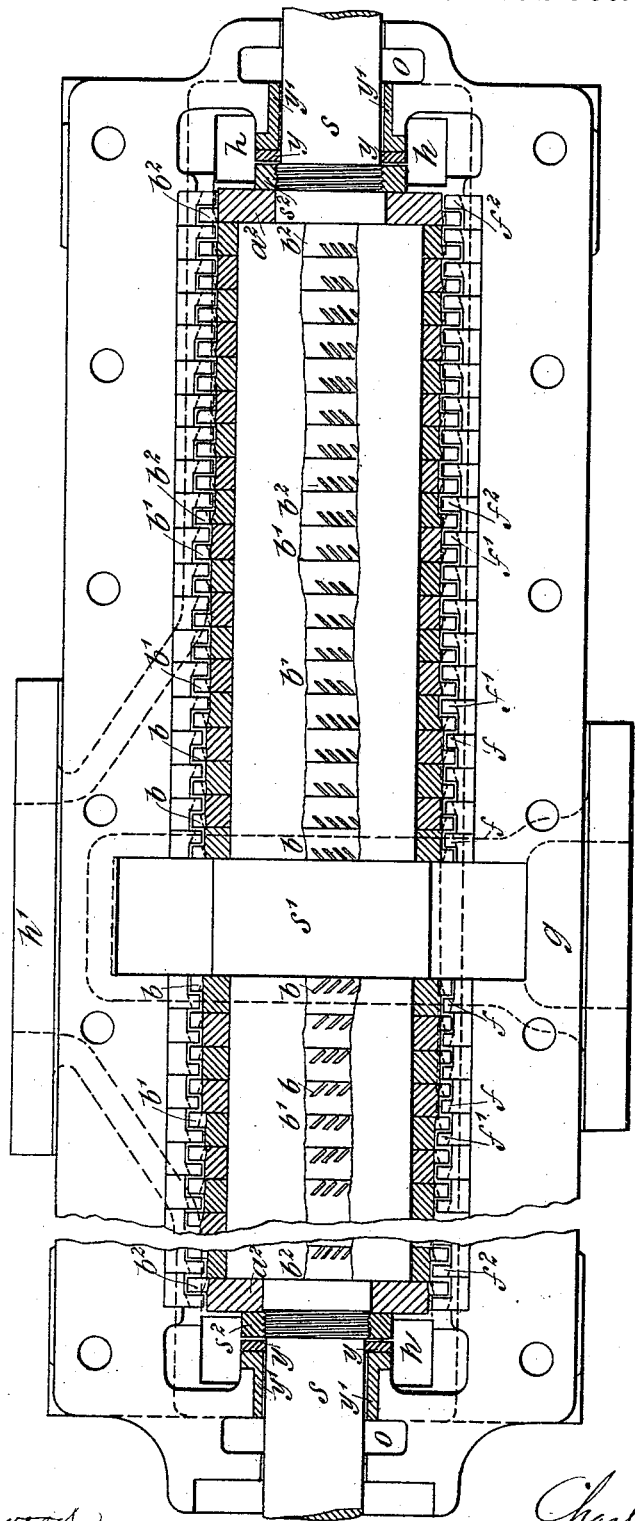

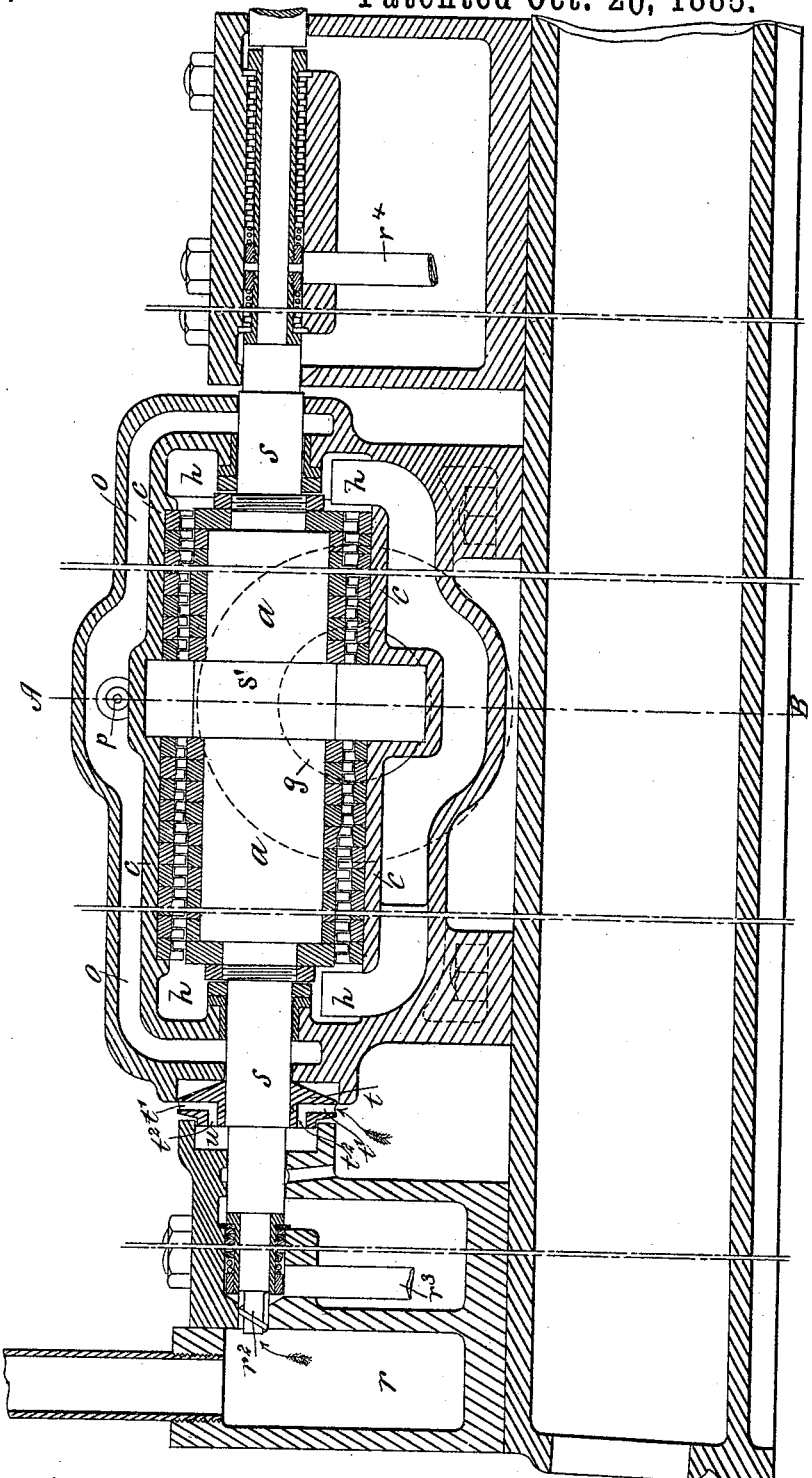

(No Model.) 5 Sheets—Sheet 4.
C. A. PARSONS.
ROTARY MOTOR.
No. 328,710. Patented Oct. 20, 1885.
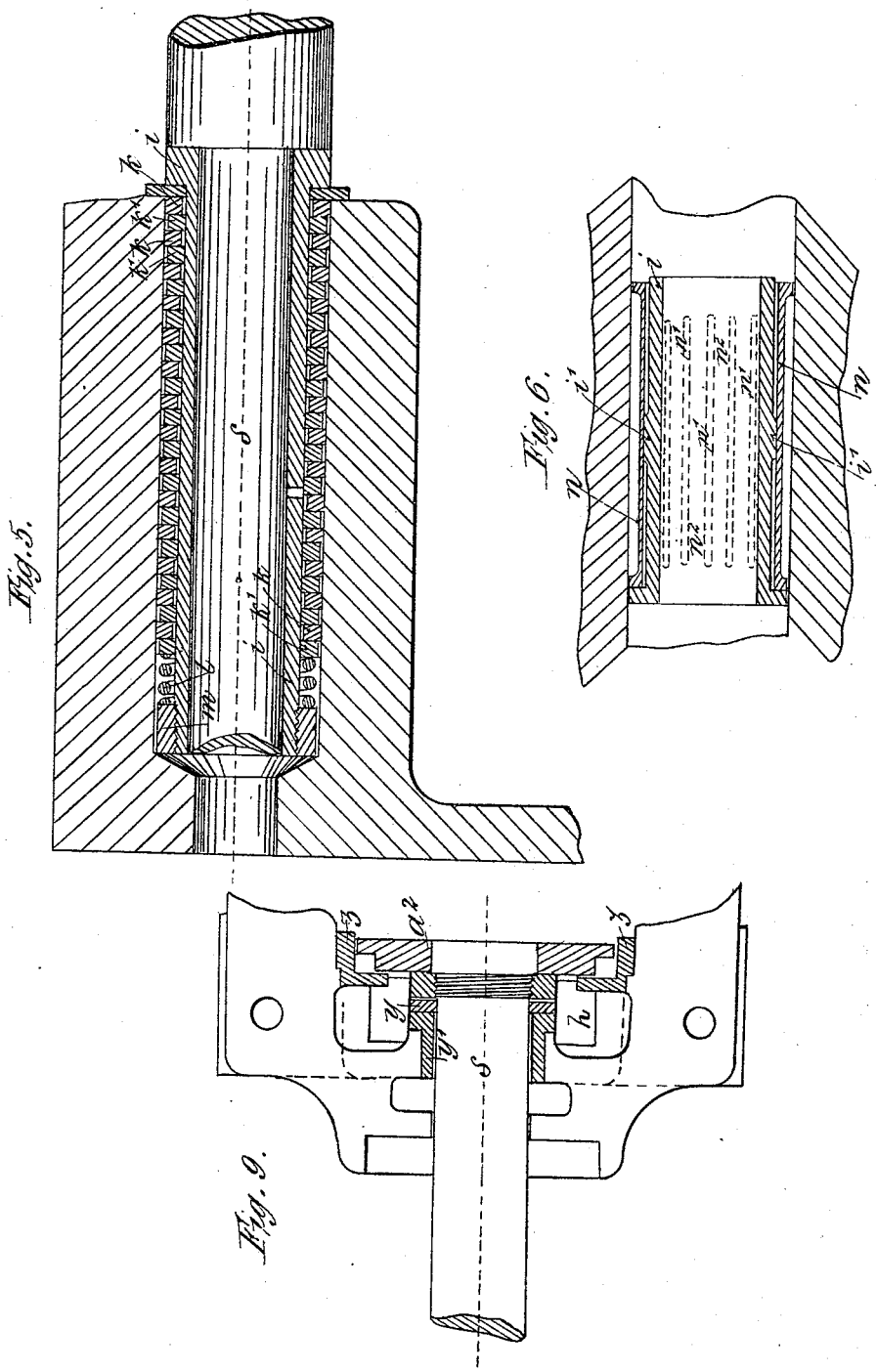
Witnesses:
J. H. Blackwood
F. T. Chapman
Inventor:
Chas. A. Parsons
by M. Doolittle, Atty

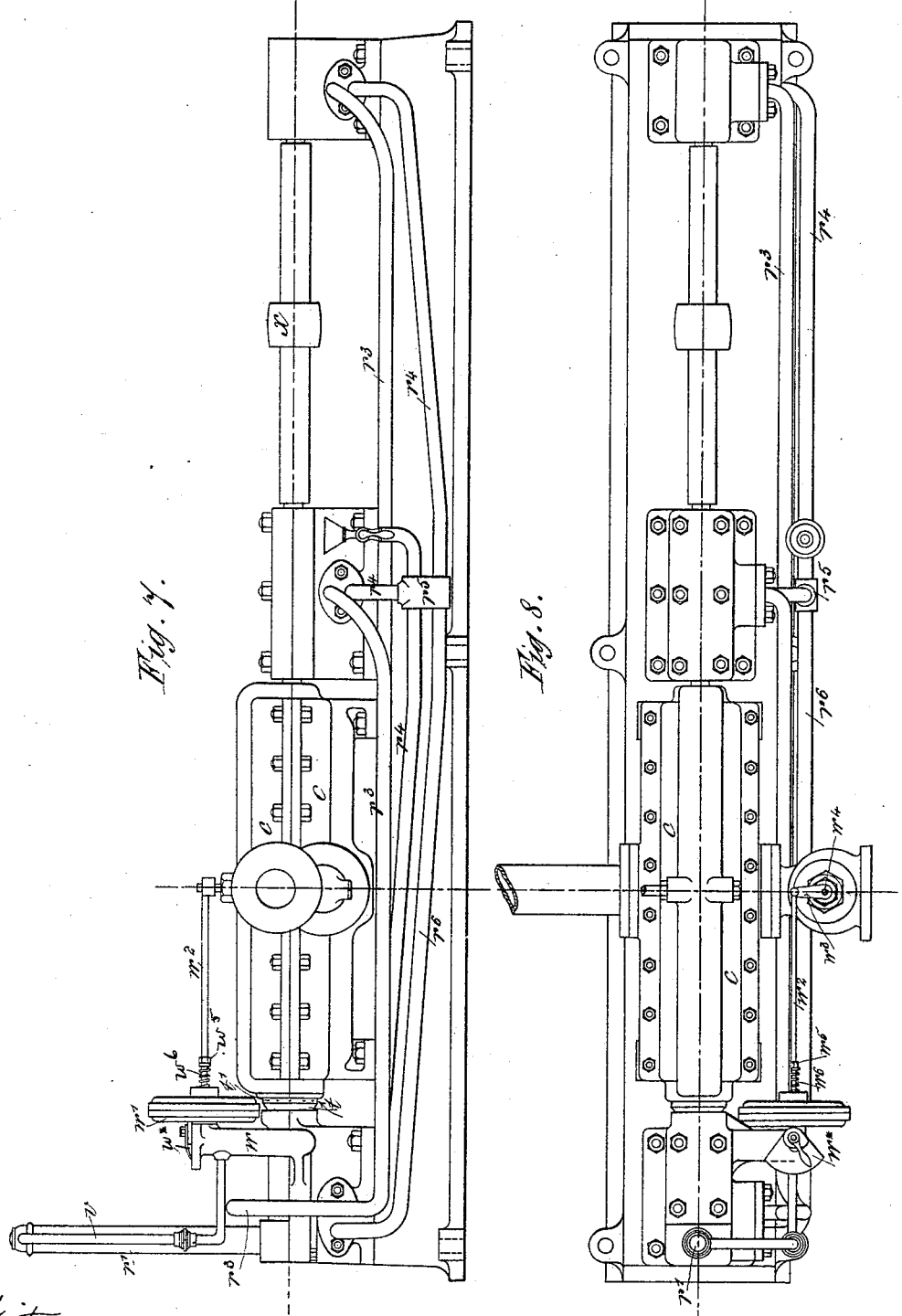

UNITED STATES PATENT OFFICE.

CHARLES ALGERNON PARSONS, OF GATESHEAD-ON-TYNE, COUNTY OF DURHAM, ENGLAND.

ROTARY MOTOR.

SPECIFICATION forming part of Letters Patent No. 328,710, dated October 20, 1885.

Application filed November 14, 1884. Serial No. 147,964. (No model.) Patented in England April 23, 1884, No. 6,735; in France November 6, 1884, No. 165,199; in Belgium November 6, 1884, No. 66,794; in Germany November 7, 1884, No. 33,066; and No. 33,263; in Italy December 31, 1884, XXXIV; 484, and in Canada July 21, 1885, No. 22,122.

*To all whom it may concern:*

Be it known that I, CHARLES ALGERNON PARSONS, a subject of the Queen of Great Britain and Ireland, residing at Gateshead-on-Tyne, in the county of Durham, Kingdom of Great Britain and Ireland, have invented new and useful Improvements in Rotary Motors Actuated by Elastic Fluid Pressure, and applicable also as pumps, of which the following is a specification.

This invention has reference to motors of the turbine type—that is to say, to motors in which the actuating-fluid operates between fixed and moving vanes or blades.

When elastic fluids, such as gas and steam, are used in a motor of this description, it is necessary for economical working that the peripheral speed of the motor should be nearly as great as the velocity of the gas or steam, due to its effluent pressure, a speed which, except with very low pressure, is practically impossible.

Now, according to my invention, to obtain a low effluent or terminal pressure, while using a comparatively high initial pressure, I use a compound motor or a combination of motors so arranged that the same actuating-fluid operates therein in a successive manner, undergoing expansion and falling in pressure in each until it leaves the last at a velocity not greatly above that which is practically attainable by the motor itself, although greatly above that practicable with a motor having oscillating or reciprocating parts. By this arrangement each motor, or successive portion of the compound motor, utilizes a portion of the energy of the fluid, and thus, instead of the greater part being wasted as heretofore, it is successively drawn upon, until a comparatively high efficiency is obtained.

The motors or successive portions of the compound motor may be arranged either upon one common shaft or upon different shafts. In the former case the first will deliver directly into the second, and the second into the third, and so on, the moving vanes of the second (say) rotating between its own fixed vanes and those of the third, and similarly for the others, the space for the actuating fluid increasing either continuously or step by step. This increase may be conveniently gained either by an increased area or by an increased pitch of the blades or by an increased area and pitch combined.

I arrange the successive motors or portions of a compound motor in such wise as to form an approximately cylindrical figure, the whole being mounted by preference upon one and the same shaft, the first delivering into the second, the second into the third, and so on. Each motor or portion comprises a set of fixed and a set of moving vanes, the direction of motion of the actuating-fluid being generally parallel, or appoximately so, to the axis of the combined motors.

Conveniently, each set of moving blades can be formed out of the solid metal on the circumference of a brass or steel disk, the blades extending only about one-third of the breadth of the disk, and the blank portion forming part of the moving clyinder beyond which the blades extend. Likewise the fixed blades can be formed by cutting each row internally on a ring, which is afterward cut diametrically into two parts, one to be joined to the top half of the casing which is divided into two parts by a longitudinal joint, and the other into the lower portion of the casing. When all the parts are put together, the fixed portion forms a hollow cylinder with projecting rings of blades, and the moving portion a solid (or hollow) cylinder, also with projecting rings of blades.

To balance the end-pressure upon the cylinder, I mount two similar sets of rotary parts upon one shaft, one set being placed at each side of the inlet for actuating-fluid in such a way that the entering stream shall divide right and left, and the exhaust take place at both ends. Any end-pressure not thus balanced, or due to external causes, can, if desired, be balanced by pressure of the exhaust-fluid acting between the end of the moving cylinder and a collar of smaller diameter than the cylinder. Thus, should the cylinder be displaced endwise in either direction, the exhaust will be checked at that end, and in this way a compensation may be automatically effected.

As the speed of the motor will be necessarily and designedly high and perfect balancing of the moving parts would not be practicable, I give to the bearings a certain very small amount of elasticity or play combined with a frictional resistance to their motion. Thus the cylinder will be enabled to rotate around its center of gravity, instead of its geometrical center, if the two be nearly coincident, and the vibration to which it may be subject will thereby be damped or modified.

The lubrication is effected by forcing lubricant to the parts to be lubricated, and for this purpose a pump can be employed. Conveniently it may be a centrifugal pump, of the type in which the fan is constructed, like a screw-propeller mounted on the end of the shaft. From this pump the oil will be taken to the bearings as required, with a constant circulation. The oil can also be used as a carrier of heat, to reduce the temperature of the parts liable to grow hot. If the pump be of a kind that will not lift, I use a suction-fan mounted on the motor-shaft to raise the oil on the suction side. This fan may also be employed to govern the supply of actuating-fluid, by causing variations of pressure, according to the speed at which it is driven, on a diaphragm or piston in connection with the throttle or supply valve. The speed of the motor may be regulated by an adjustable spring acting against this varying pressure or by the admission of air through a graduated regulating-tap into the exhausting side of the fan.

To prevent leakage past the shaft at the end covers of the casing, which, when steam is the actuating-fluid, would be inconvenient, I form annular recesses in the covers around the shaft ends, and place these recesses in communication with a pipe in which a partial vacuum is maintained by suitable means, such as a steam-jet. Any steam which enters the recesses will thus be drawn away without apparent leakage.

Motors according to my invention are applicable to a variety of purposes, and if such an apparatus be driven it becomes a pump, and can be used for actuating a fluid column, or producing pressure in a fluid. Such a fluid pressure-producer can be combined with a multiple motor, according to my invention, so that the necessary motive power to drive the motor for any required purpose may be obtained from fuel or combustible gases of any kind. For this purpose I employ the pressure-producer to force air or combustible gases into a close furnace of any suitable kind, such as used for caloric engines, into which furnace there may or may not be introduced other fuel, (liquid or solid.)

From the furnace the products of combustion can be led in a heated state to the multiple motor, which they will actuate. Conveniently the pressure-producer and multiple motor can be mounted on the same shaft, the former to be driven by the latter; but I do not confine myself to this arrangement of parts.

The blades should be of material that will withstand high temperatures; or I may employ water or other fluid to cool the blades. This may be done by providing in the cylinders that carry the blades channels or passages for the circulation of cooling-fluid, which in the case of the rotary cylinder may be supplied through a passage or passages in the shaft carrying the cylinders.

And in order that the manner of carrying my said invention into practical effect may be clearly understood, I proceed to more particularly describe the same with reference to the accompanying illustrative drawings.

Figure 1 is a detailed sectional plan of the motor, portions being omitted, and the blades being shown partly in section and partly in elevation. Fig. 2 is a cross-section through the center of the motor. Fig. 3 is a central longitudinal vertical section to a reduced scale, showing besides the parts represented in Fig. 1 also the bearings and bed-plate. Fig. 4 is a cross-section in the line A B of Fig. 3. Fig. 5 is an enlarged sectional view showing one of the elastic bearings. Fig. 6 is a section of another form of elastic bearing. Fig. 7 is a side elevation showing the general arrangement of the motor. Fig. 8 is a corresponding plan or top view. Fig. 9 shows the arrangement of a ring, $z$, for aiding to balance end-pressure upon the shafts.

Two compound or built-up cylinders are mounted on the cylindrical enlargements $a\ a$ of a shaft, $s$, so as to rotate therewith. $b\ b'\ b^2$, $b\ b'\ b^2$ are sets of blades on each cylinder. $c$ is a casing in two parts bolted together, as indicated in Figs. 7 and 8. $f\ f'\ f^2, f\ f'\ f^2$ are blades fixed within the casing $c$, these blades being inclined in opposite direction to the blades on the rotating cylinders. In the arrangement as drawn each set of moving blades is represented as being formed out of solid metal on the circumference of a brass or steel disk or ring, a number of these disks or rings being threaded on the parts $a\ a$ of the shaft $s$, which is formed with a collar or projection, $s'$, between $a\ a$. At each end is a disk or ring (with blades) that fits on a smaller portion, $a^2$, of the shaft. The shaft is provided with nuts or screwed collars $s^2\ s^2$ at the respective ends, by which the set of disks or rings with blades forming each cylinder is held in place against $s'$. The fixed blades are represented as being formed by cutting each row internally on a ring, which is afterward cut diametrically into two parts, one of which is joined to the top half of the casing $c$ (by a small longitudinal feather mentioned below) and the other to the lower portion of that casing. It will be seen that the fixed portion forms a hollow cylinder with projecting rings of blades and the moving portion a built-up solid or compound cylinder, also with projecting rings of blades.

The rings with which the blades are formed are prevented from turning by feathers, those for the fixed rings being sunk in the hollow cylinder at an angle of about forty-five degrees to the vertical line, and those for the other rings being sunk in the shaft with which they revolve. It is to be noted that although I have shown straight blades cut from the solid, because such blades present facilities of manufacture, and by means of dies can be readily set to any desired shape, yet other forms of blades may be employed.

In some cases it may be found convenient to make the blades of sheet metal and to secure them in suitable grooves or recesses in the rings. In this way the blades may be made thinner, and they may be accurately formed either before or after insertion in the rings.

I will assume that steam is the actuating-fluid employed. It enters the motor at its center $g$, and travels toward each end of the motor between the respective moving cylinders and fixed casing $c$, acting in its passage upon the blades $b\ b'\ b^2$, $b\ b'\ b^2$, and being deflected and guided by the fixed blades $f\ f'\ f^2, f\ f'\ f^2$ until it reaches the exhaust-passages $h\ h$, which are carried underneath the motor to the center, the exhaust-branch $h'$ being at the opposite side of the motor to the supply-branch. It will be seen on examining the blades $b\ b'\ b^2$ that where the steam enters they are comparatively shallow, but toward the respective ends of the motor they increase in depth by sets, $b'$ being deeper than $b$, and $b^2$ deeper than $b'$. It will also be seen on reference to the drawings that where the steam enters the blades are set at a greater angle than where it exhausts; hence as the steam-pressure decreases it meets with sets of blades of increased area and pitch, the increase being so calculated that the velocity of the steam shall be suitable to that set of blades between which it has to pass. By these means the gradations of pressure are governed. It will be understood that as the steam flows toward the respective ends of the motor its action upon the blades $b\ b'\ b^2$ will have the effect of imparting rapid rotary motion to the shaft $s$.

With motors designed to run at very high speeds difficulties occur in practice, owing to oscillations arising from unavoidable errors of workmanship and balance in the moving parts. To obviate such difficulties according to my invention, I provide for giving to the bearings a certain very small amount of elasticity or play combined with a frictional resistance to their motion, and this I do in the arrangement of motor now under description by constructing the bearings of shaft $s$ in the manner represented in Fig. 3 and more clearly in Fig. 5.

$i$ is a light bush, outside of which are placed metal rings or washers $k\ k'$. The alternate washers $k$ are slightly larger than the washers $k'$, so that the alternate washers $k$ fit the casing but not the bush, and the washers $k'$ fit the central bush but not the casing. $l$ is a spiral spring, and $m$ is a nut. By these the rings or washers $k\ k'$ are pressed tightly together. Thus the bush is capable of a slight lateral movement; but this movement is resisted and controlled by the rings or washers and their mutual friction. The amount of liberty given to the rings or washers may be, say, one-hundredth part of an inch diametrically; but it may be more or less, according to circumstances, as may be found desirable in practice. It will be evident that any movement of the central bush in a lateral sense will be opposed by the frictional resistance of the rings or washers.

In lieu of or in conjunction with rings or washers, such as $k\ k'$, with spiral spring and nut, a steel cage, such as illustrated in Fig. 6, may in some cases be used to surround the bush $i$, for the purpose of maintaining it in place, while admitting of very slight lateral play or elasticity. This cage $n$, as represented, is formed with longitudinal slots $n'$, so that the intervening parts $n^2$ will act as springs, pressing tightly against the central projecting part $i'$ of the bush, thus resisting any lateral movement, principally by elasticity of the cage. To obtain very quiet running, however, I prefer to use the arrangement illustrated in Fig. 5, or a combination of the two arrangements, constructed by placing a steel cage, such as $n$ or its equivalent, around the washers $k\ k'$, in order to check the communication of vibrations from the rings or washers to the bearing itself.

$y\ y$ are metal washers fitting easily on shaft $s$, to prevent leakage of steam past the bushes $y'\ y'$.

$o\ o$ are drain-passages from each end of the hollow cylinder. They pass over the top of the motor and meet at its center. Their purpose is to drain away any of the steam that may escape between the shaft $s$ and bushes $y'$ fixed in the motor. This is effected by an arrangement shown clearly in Figs. 2 and 4. Where the drain-passages $o\ o$ meet there is provided an ejector or steam-nozzle, $p$, to which steam is admitted from the supply-branch. This steam blows into an exhaust-pipe, $q$, and the partial vacuum thus created causes the steam to flow from the passages $o\ o$, and to pass away through the drain-pipe $q$.

I will now describe the arrangements for lubricating the bearings and regulating the speed of the motor.

$r$ is a chamber to contain lubricant. $r'$ is a stand-pipe in communication with this chamber. $r^2$ is a small screw-pump fixed on the motor-shaft $s$. Figs. 7 and 8 show clearly the arrangement of oil-pipes. $r^3$ is a delivery-pipe, with branches, and leads to all the bearings except the one lubricated directly by the screw-pump. $r^4\ r^4$ are the return-pipes, which lead directly to a central junction piece, $r^5$, whence the lubricant is conveyed to the chamber $r$ (Fig. 3) by $r^6$, and again drawn by the pump. I prefer to place the junction-piece $r^5$ in the center in order that the screw-pump may draw in all positions of the motor in case of its being used on board ship. *t* is a fan that serves the double purpose of exhausting air from the stand-pipe *r'*, and regulating the speed of the motor by the suitable arrangements connected with it, which I will explain presently. The fan *t*, which revolves with the motor-shaft *s*, is formed as a solid body with a number of radial holes, *t'*, connected by transverse holes $t^2$, to a cavity, *u*, which is in direct communication, by a small pipe, *v*, (Fig. 7,) with the top of the stand-pipe *r'*. The centrifugal force acting upon the air in the radial holes causes the partial vacuum or suction necessary to raise the lubricant in the stand-pipe *r'*, so that the small screw-pump $r^2$ can force the lubricant into the bearing and cause it to circulate by means of the pipes described to the other parts that require lubrication, and back again to the chamber or reservoir *r*, connected with the stand-pipe *r'*.

The arrangement for regulating the admission of actuating-fluid to the motor by means of the fan *t* is as follows: The fan is in direct communication with a diaphragm or piston through a cored hole passing through the upright portion of the bearing-casting (marked *w*, Fig. 7) from the pipe *v* to a casing, *w'*. This diaphragm or piston is connected by a rod, $w^2$, and arm $w^3$, to the spindle of the throttle-valve $w^4$. Between the casing *w'* and a collar or nut, $w^5$, on the rod $w^2$ is a spiral spring, $w^6$. The fan by its rotation creates a partial vacuum at one side of the diaphragm or piston, which produces a sucking action counteracted by the spiral spring. Should, however, the speed of the motor exceed that for which the spring is set, the diaphragm or piston will be moved in opposition to the spring, and by operating the throttle-valve will regulate the admission of steam accordingly.

$w^*$ is a graduated tap, through which more or less air can be admitted at will to regulate the pressure on the pump side of the diaphragm or piston, so that the action of the diaphragm or piston can be in this way modified and the speed of the motor controlled.

*x* is a pulley on the motor-shaft for conveying the motion to any desired part; but I consider it preferable to couple the motor directly to its work in a manner that will be well understood.

A compound motor such as described, may be applied to marine propulsion; but as the velocity is necessarily high it will be advisable to place several fine-pitched screws on the shaft, in order to obtain a sufficient area of propeller-blade; and one screw may be prevented from interfering with another or others by suitable guide-blades or by other means.

If the fluid employed to actuate a motor according to my invention be not elastic, no allowance for expansion is made, and such a motor may be worked from hydraulic mains or accumulators whenever it is required to obtain a reduction of speed over the ordinary turbine motor. If my motor be coupled to and used to drive a compound pump for water or other heavy fluid, very high pressures may be obtained on the delivery side, and such a combination may be used for charging accumulators and for other purposes where high pressures are required.

The lubricating and speed-governing mechanisms herein described are not now specifically claimed, but are reserved as the subjects of other applications.

What I claim is—

1. An inner cylinder having parallel rows of projecting blades on the periphery thereof, each row being in a plane perpendicular to the axis of the cylinder, and each blade being inclined to the axis of the cylinder, and an outer hollow cylinder inclosing said inner cylinder and concentric therewith, one of said cylinders being a rotary one, said outer cylinder being provided on its inner surface with parallel rows of inwardly-projecting blades, each row being in a plane perpendicular to the axis of the cylinder, and each blade being inclined to the axis of the cylinder, and in a direction opposite to the inclination of the blades on the inner cylinder, the rows of blades on the two cylinders being so related that they intermesh in combination with fluid inlet and discharge passages located at opposite ends of said cylinder, substantially as set forth, whereby the current of the fluid is between the two cylinders and in a direction parallel or substantially parallel with the common axis of the cylinders.

2. A single inner shaft or cylinder having two distinct sets of parallel rows of projecting blades on the periphery thereof, each row being in a plane perpendicular to the axis of the cylinder, and a hollow outer cylinder inclosing said inner cylinder, and concentric therewith, one of said cylinders being a rotary one, said outer cylinder having on its inner surface two distinct sets of parallel rows of inwardly-projecting blades, each row being in a plane perpendicular to the axis of the cylinder and each blade being inclined to the axis of the cylinder in a direction opposite to the inclination of the blades on the inner cylinder, and the rows of blades on the two cylinders being so related that they intermesh, in combination with a fluid-inlet passage located centrally in relation to the length of the cylinders and between the two distinct sets of blades on the cylinders, and fluid-discharge passages at the opposite ends of said cylinders, substantially as set forth, whereby the current of the fluid is from the center in opposite directions to the two ends of the cylinders, thereby balancing the end-pressure of the cylinders.

3. In a compound motor, the rotating cylinders provided with the sets of fixed blades increasing in depth by sets from the entrance of the actuating-fluid and set at a greater angle at said entrance than at the exhaust, in combination with the casing provided with the blades inclined in opposite direction to the blades on the rotating cylinders, substantially as and for the purpose described.

4. In a motor, the combination of a hollow cylinder or cylinders furnished with blades on its or their interior, a moving cylinder or cylinders having external blades, and mounted on a shaft to rotate within said hollow cylinder or cylinders, and bearings for said shaft having slight lateral play or elasticity combined with frictional resistance to such play in such a manner as to enable the moving cylinder or cylinders to rotate about its or their center of gravity or principal axis instead of its or their geometrical center or axis, (if the center of gravity and geometrical center be nearly coincident,) and to cause the vibration to which the cylinder or cylinders may be subjected to be damped or modified, substantially as described.

5. In a motor, the combination of a hollow cylinder or cylinders furnished with blades on its or their interior, a moving cylinder or cylinders having external blades, a shaft on which said moving cylinder or cylinders is or are mounted, and elastic bearings, each comprising a bush and friction-rings or washers pressed tightly together by a spring or springs in such a manner that the bush is capable of slight lateral movement, resisted and controlled by the friction-rings or washers, as described and illustrated, for the purpose specified.

6. A motor (or pump) comprising two compound or built-up cylinders, with blades $b\ b'\ b^2$, a casing, $c$, blades $f\ f'\ f^2$, fixed within said casing, central inlet, $g$, exhaust-passages $h\ h$, shaft $s$, bushes $i$, metal rings or washers $k\ k'$, spiral springs $l$, nuts $m$, drain-passages $o\ o$, ejector or steam-nozzle $p$, exhaust-pipe $q$, chamber $r$, pump $r^2$, pipes $r^3\ r^4$, junction-piece $r^5$, fan $t$, with holes $t'\ t^2$, cavity $u$, a diaphragm rod, $w^2$, arm $w^3$, spindle $w^4$, collar or nut $w^5$, spring $w^6$, and graduated tap $w^*$, all substantially as described and illustrated.

CHARLES ALGERNON PARSONS.

Witnesses:
JAMES MASON LATHAEN,
JAMES WILLIAM McROBERT,
*Clerks to Messrs. Watson & Dendy, Solicitors, 741 Pilgrim Street, Newcastle-upon-Tyne.*